United States Patent
Fernkopf et al.

[15] 3,697,159
[45] Oct. 10, 1972

[54] FILM STRIP CARTRIDGE

[72] Inventors: Forrest D. Fernkopf, 2521 Sunset Road; Gilbert E. Wehmeier, 5608 W. 24th Street, both of Topeka, Kans. 66614

[22] Filed: April 5, 1971

[21] Appl. No.: 131,097

[52] U.S. Cl............352/128, 242/55.19 A, 352/78 R
[51] Int. Cl..............................................G03b 21/00
[58] Field of Search...................352/78 R, 126, 128; 242/55.19 A

[56] References Cited

UNITED STATES PATENTS

| | | |
|---|---|---|
| 2,239,241 | 4/1941 | Miller et al. ............352/128 X |
| 3,475,089 | 10/1969 | Funck..................352/78 R X |
| 3,591,271 | 7/1971 | Shropshire...............352/78 R |
| 1,904,097 | 4/1933 | Steiner.................352/78 R X |
| 3,446,551 | 5/1969 | Platt....................352/126 UX |

*Primary Examiner*—Samuel S. Matthews
*Assistant Examiner*—Fred L. Braun
*Attorney*—D. A. N. Chase

[57] ABSTRACT

A film cartridge employing an endless, unspooled roll of film having an external loop presenting the active part of the film and feeding from the outside of the roll to the inside thereof. The cartridge has a rectangular case provided with a pair of side-by-side compartments which receive the roll and the loop respectively, the roll being held in an inclined position in which it leans into the adjacent compartment to dispose the outside and inside of the roll therein with the loop. The case has a flat bottom upon which it is self-supporting in an upright position, and a protective sheath fits over the front of the case to provide a self-storing cartridge assembly.

9 Claims, 5 Drawing Figures

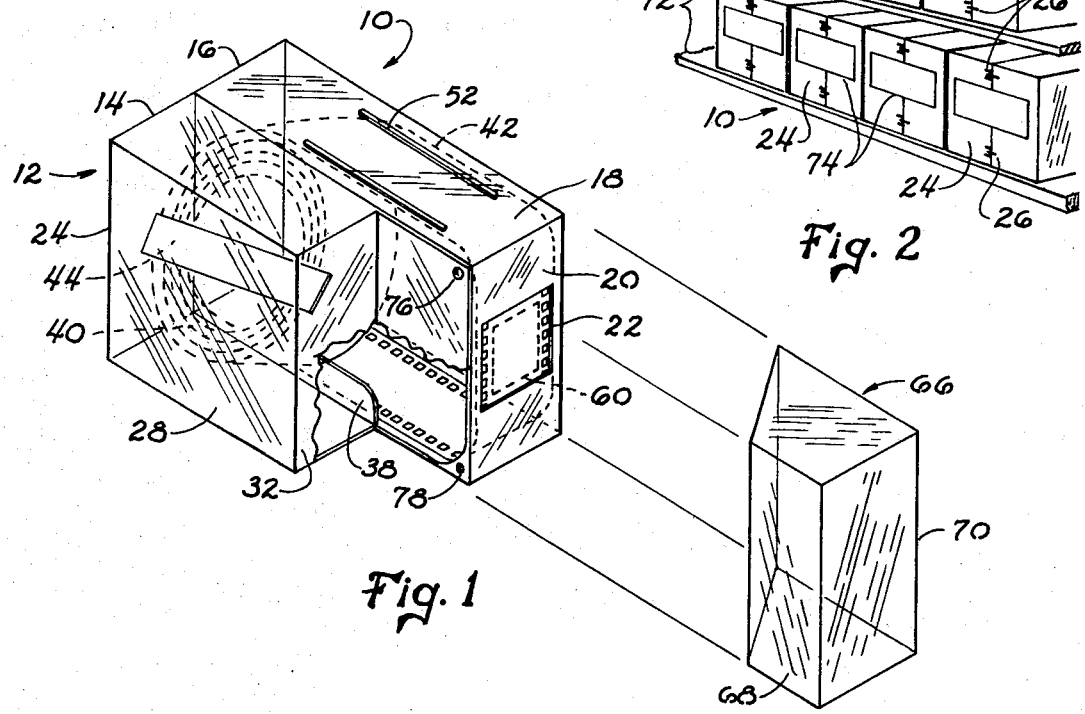
Fig. 2
Fig. 1
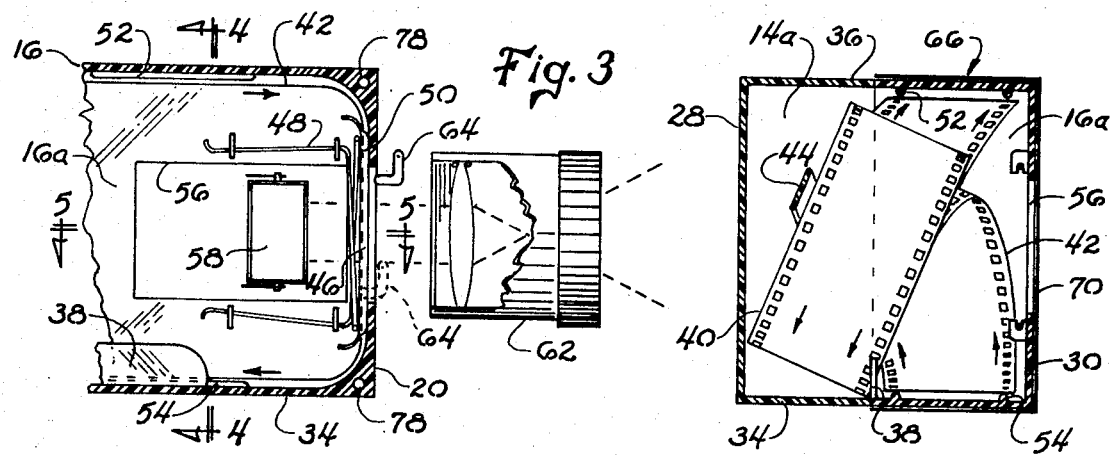
Fig. 3
Fig. 4
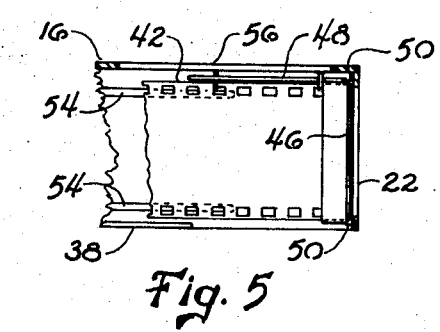
Fig. 5
Forrest D. Fernkopf
Gilbert E. Wehmeier
INVENTORS
BY D. A. N. Chase
ATTORNEY 3,697,159

FILM STRIP CARTRIDGE

This invention relates to improvements in film cartridges of the type that employ an endless, unspooled roll of film and, in particular, to a self-storing cartridge assembly particularly adapted to handle relatively wide film strips that are incrementally advanced from frame to frame to project a series of still pictures.

Visual and audio-visual presentations are in widespread use as an instructional tool both in schools and in industry. In particular, still picture presentations are preferred in many instances since the projected image is of high quality and the speed at which the material is presented may be controlled by the instructor. Both slides and film strips are available media, but both presently have disadvantages from the standpoint of handling. With slides, of course, individual frames must be stored and handled and fed sequentially into the projector either by hand or automatic means. Film strips obviate much of this difficulty, but still have to be loaded into the projector on storage and takeup sprockets.

In the case of motion picture films, many of the handling difficulties previously associated with the film reels have been eliminated through the use of a film cartridge within which the film is contained in the form of an endless, unspooled roll. Cartridges of this type are shown and described in U.S. Letters Pat. No. 3,244,471, issued Apr. 5, 1966, but this cartridge construction has a number of disadvantages for still picture presentations. First of all, these cartridges are primarily for 8 mm. motion picture film, rather than the larger and heavier 35 mm. film used in still picture work. If enlarged to accommodate 35 mm. film strips, the cartridge is unduly large in size and clumsy to handle. Furthermore, cartridges of this type are stored in separate containers to prevent dust damage, thereby further increasing the bulk of the overall assembly. Also, greater flexibility is desired in films for still picture presentations, such as the ability to splice and edit, which are not of as much importance when working with a complete motion picture presentation.

It is, therefore, the primary object of this invention to provide a film cartridge for handling film strips utilized in sequential, still picture presentations, in order to eliminate the handling problems discussed above and provide a convenient means of storing the film strips during periods of non-use.

It is also another important object of the invention to provide a cartridge as aforesaid in which the film strip therein is in the form of an endless, unspooled roll of film, and wherein the cartridge case is provided with side-by-side compartments especially arranged to receive the roll and an external loop presenting the active part of the film which is fed from the outside of the roll to the inside thereof.

Another important object of the invention is to provide a film cartridge as aforesaid having a unique yet uncomplex internal construction that enables the cartridge to readily handle endless, unspooled film strips that are wide relative to the diameter of the roll, such as 35 mm. film strips which are presently in widespread use.

Still another important object of this invention is to provide a cartridge as aforesaid having a flat bottomed, rectangular case that renders the cartridge self-supporting on such bottom in an upright position, and further enables a plurality of the cartridges to be arranged side by side in a row for convenient storage.

Furthermore, it is an important object of the present invention to provide a cartridge assembly for a film strip which is self-storing in that an additional storage container for the cartridge case is not required, yet the roll of film within the cartridge case is at all times protected from the ingress of dirt and foreign particles during periods of storage.

In the drawing:

FIG. 1 is a perspective, exploded view of the cartridge assembly, viewing the cartridge case from the top front;

FIG. 2 is a perspective view showing several cartridges arranged on shelves for storage thereof;

FIG. 3 is a longitudinal, fragmentary, vertical sectional view through the cartridge case showing the compartment in which the external loop of the film is disposed, the components of a projection system being diagrammatically illustrated;

FIG. 4 is a vertical sectional view taken along line 4—4 of FIG. 3, and showing the protective sheath in place on the cartridge case; and FIG. 5 is a horizontal sectional view taken along line 5—5 of FIG. 3.

Referring to the Figures, the film cartridge of the present invention is broadly denoted by the numeral 10 and includes a case 12 of rectangular configuration. The case 12 may be of molded plastic construction (illustrated herein as transparent) and is divided into a pair of sections 14 and 16 that define a pair of side-by-side, internal compartments 14a and 16a respectively. It may be noted that both of the compartments 14a and 16a are rectangular in configuration, but that the compartment 16a is longer front to rear, thereby providing the case 12 with a nose portion 18 that projects forwardly from the main body of the case 12. The nose portion 18 presents a front wall 20 having an opening 22 therein, and the two sections 14 and 16 jointly present an opposite, rear wall 24 best seen in FIG. 2. A pair of hinges 26 interconnect the two sections 14 and 16 at the center of the rear wall 24, thereby permitting opening and closing of the case 12 as will be discussed hereinafter.

The two sections 14 and 16 present opposite, outer side walls 28 and 30 respectively of the case 12, and the front of the smaller section 14 presents an intermediate wall 32 which lies in an upright plane between and parallel to the parallel front wall 20 and rear wall 24. By virtue of the rectangular configuration of the case 12, it should be noted that the case has a flat bottom 34 upon which the case is self-supporting in an upright position. This may be clearly seen in FIG. 4, where it is also evident that the case has a flat top 36 and is of rectangular configuration whether viewed in longitudinal or transverse cross-section.

The inner edge of the case section 16 is provided with an upstanding divider element 38. As may be seen from a comparison of FIGS. 1, 3 and 4, taking into consideration the directions of the arrows, the film within the case 12 is in the form of an endless, unspooled roll having an external loop 42 which is fed from the outside of the roll 40 to the inside thereof. The compartments 14a and 16a receive the roll 40 and the loop 42 respectively, the main body of the roll 40 being retained within the compartment 14a by virtue of engagement of the lower, inner edge of the roll 40 with the divider element 38. Furthermore, due to the fact that the space between the element 38 and the side wall 28 is less than the width of the film of the roll 40, the roll is held in an inclined position in which it leans into the adjacent compartment 16a to dispose the outside and inside of the roll 40 in compartment 16a along with the loop 42. The natural rigidity of the film prevents the roll 40 from leaning over completely across the compartment 16a, and undue lateral displacement in the other direction is limited by a stop bar 44 which extends from the intermediate wall 32 to the rear wall 24 within the compartment 14a in a somewhat diagonal attitude as is clear from viewing FIGS. 1 and 4. The angle with the horizontal formed by the axis of the roll 40 is approximately 25°, thus such axis extends upwardly toward the side wall 28 and downwardly toward the opposite side wall 30.

The film loop 42 extends forwardly in the compartment 16a and is confined between the front wall 20 and a guide in the nature of a pressure plate 46. Accordingly, the projection plane of the film is immediately behind the front wall 20, a spring 48 being connected to the pressure plate 46 to yieldably urge the latter toward the front wall 20. The plate 46 has lateral edges 50 which are bent in a forward direction to provide a guide slot for the film between the plate 46 and the front wall 20 in order to relieve the possible tendency of the film to bind. A pair of internal guide ribs 52 on the top 36 of the section 16 and a corresponding pair of internal guide ribs 54 on the bottom 34 are aligned with the sprocket holes of the film to hold the loop 42 out of frictional contact with the top and bottom internal surfaces of the case section 16.

In order to accommodate the projection system of a film strip projector, a clearance opening 56 is provided in the side wall 30 adjacent the front wall 20 to permit a mirror 58 (FIG. 3) to swing in and out of the compartment 16a in the same manner as in motion picture projectors that accommodate film cartridges. The projection lamp (not shown) directs the projection light to the mirror 58 where it is reflected in a forward direction through an aperture 60 in the plate 46, and thence through the film and the opening 22. The light bearing the image on the film is then received by the projection lens apparatus as illustrated at 62. A film advance claw 64 is shown and would form a part of a film advance mechanism controlled by the operator to effect incremental shifting of the individual frames into alignment with the aperture 60. The solid and broken line illustrations of the claw 64 represent the stroke of the claw in advancing a frame, the normal position of the claw 64 being shown in the solid lines and the limit of its downward stroke being illustrated in the broken lines. Suitable means (not shown) is provided to shift the claw 64 inwardly into engagement with one of the sprocket holes of the film as it commences its downward stroke.

For storage purposes, a sheath 66 (FIGS. 1 and 4) is provided which slips over the nose portion 18 of the case 12 to provide a protective cover that closes both the opening 22 in front wall 20 and the access opening 56 in side wall 30. To this end, the sheath 66 is of rectangular configuration except for its opposite side walls 68 and 70, the side wall 68 being shorter in length to accommodate the distance between the front wall 20 and the intermediate wall 32. The longer side wall 70 extends along the corresponding side wall 30 of the case 12 a sufficient distance to cover the clearance opening 56 when the sheath 66 is in place. The sheath 66 is formed of thin sheet material and sized to fit snugly over the nose portion 18, thereby providing an effective seal against the ingress of dust and other foreign particles without interfering with the overall rectangular shape of the case 12.

The rectangular configuration of the case 12 is important from the standpoint of providing both a self-supporting and a self-storing cartridge assembly. This may be appreciated from viewing FIG. 2 where several of the cartridges 10 are shown on a pair of shelves 72. It may be noted that the cartridges 10 on the shelves 72 are arranged in rows with each pair of adjacent cartridges abutting each other in side-by-side relationship, i.e., the side wall 28 of one cartridge is in direct contact with the side wall 30 of an adjacent cartridge. This not only minimizes storage space, but eliminates the need to provide an individual rectangular container for each of the cartridges 10 to facilitate storage thereof. Accordingly, the films may be readily identified by labels 74 on the rear walls 24 of the cartridges 10, and a selected cartridge may be taken from storage for use simply by withdrawing the cartridge from the storage shelf, removing the sheath 66 and inserting the cartridge in the projector.

Another feature of the present invention is in the provision of the hinges 26 that permit the case 12 to be opened if desired for splicing or replacement of the film therein. In normal use and storage, the two sections 14 and 16 are maintained tightly closed by a pair of screws 76 at the forwardmost, upper and lower corners of the section 14 received within tapped openings 78 in the mating corners of the section 16.

Having thus described the invention, what is claimed as new and desired to be secured by Letters Patent is:

1. A film cartridge comprising:
   a case of generally rectangular configuration provided with a pair of side-by-side compartments, and having a rear wall, a front wall defining a film projection plane immediately therebehind, and a flat bottom upon which the case is self-supporting in an upright position;
   an endless, unspooled roll of film in said case having an external loop presenting the active part of the film and feeding from the outside of said roll to the inside thereof;
   structure in said case engaging said roll to maintain a portion of the main body thereof in one of said compartments and hold said roll in an inclined position in which the roll leans into the other of said compartments to dispose the outside and inside of the roll and said loop in said other compartment,
   said other compartment presenting said front wall; and
   a guide in said other compartment adjacent said front wall and confining the active part of said loop to a path of travel in said projection plane,
   said one compartment terminating forwardly at an intermediate wall lying in an upright plane between said front and rear walls, said other compartment having a nose portion projecting forwardly ahead of said intermediate wall and presenting said front wall, said intermediate wall retaining the main body of said roll against forward movement during feeding of said loop.

2. The cartridge as claimed in claim 1, wherein said compartments present opposite, outer sidewalls of said case, and the axis of said roll in said inclined position extends upwardly toward the sidewall presented by said one compartment and downwardly toward the sidewall presented by said other compartment.

3. The cartridge as claimed in claim 2, wherein said structure includes a divider element between said compartments projecting upwardly from said bottom wall and retaining said portion of the main body of the roll in said one compartment.

4. The cartridge as claimed in claim 1, wherein said case has a top and is provided with internal guide ribs in said other compartment along said top and said bottom engageable by said loop to hold the loop out of frictional contact with the top and bottom internal surfaces of said case.

5. The cartridge as claimed in claim 1, wherein said case comprises a pair of sections, and hinge means on said rear wall interconnecting said sections for relative movement thereof to open and close said case.

6. A self-storing cartridge assembly for an endless, unspooled roll of film having an external loop presenting the active part of the film and feeding from the outside of said roll to the inside thereof, said assembly comprising:
a case of generally rectangular configuration having a rear wall, a front wall defining a film projection plane immediately therebehind, and a flat bottom upon which the case is self-supporting in an upright position,
said case being provided with a pair of side-by-side compartments for receiving said roll and said loop respectively, and means for retaining a portion of the main body of said roll in one of said compartments while permitting free feeding of said loop in the other of said compartments,
said one compartment terminating forwardly at an intermediate wall lying in an upright plane between said front and rear walls, said other compartment having a nose portion projecting forwardly ahead of said intermediate wall and presenting said front wall, said intermediate wall retaining the main body of said roll against forward movement during feeding of said loop;
a guide in said other compartment adjacent said front wall for confining the active part of said loop to a path of travel in said projection plane,
said front wall having an opening therein for projection of images on said active part therethrough; and
a removable sheath slipped over said nose portion and receiving the latter in close fitting relationship thereto, and presenting a protective cover to prevent dust and other foreign particles from entering said opening during storage.

7. The cartridge assembly as claimed in claim 6, wherein said other compartment presents an outer sidewall having a clearance opening therein adjacent said front wall for receiving a component of a projection system when the sheath is removed, said sheath extending along said sidewall and covering said clearance opening when the sheath is in place on said nose portion.

8. The cartridge assembly as claimed in claim 6, wherein said compartments present opposite, outer sidewalls of said case lying in parallel, upright planes to permit a plurality of the cartridge assemblies to be arranged side by side in a row.

9. The cartridge assembly as claimed in claim 8, wherein label is provided on said rear wall for identifying the film.

* * * * *